United States Patent [19]
Henmi et al.

[11] Patent Number: 5,274,618
[45] Date of Patent: Dec. 28, 1993

[54] TEST APPARATUS FOR AN OPTICAL RECORDING DISC

[75] Inventors: Fumiaki Henmi; Tomio Ohashi; Kunio Nakayama, all of Kanagawa, Japan

[73] Assignee: Sony Corporation, Tokyo, Japan

[21] Appl. No.: 561,711

[22] Filed: Aug. 1, 1990

[30] Foreign Application Priority Data

Aug. 8, 1989 [JP] Japan ................... 1-205222

[51] Int. Cl.$^5$ .............................................. G11B 7/00
[52] U.S. Cl. .......................................... 369/54; 369/2; 369/4; 369/5
[58] Field of Search ............... 369/2, 4, 5, 53, 54, 369/55, 58; 381/28, 94; 358/341, 343

[56] References Cited

U.S. PATENT DOCUMENTS

| | | | |
|---|---|---|---|
| 4,660,099 | 4/1987 | Sugiyama et al. | 358/341 |
| 4,698,695 | 10/1987 | Kosaka et al. | 358/343 |
| 4,723,295 | 2/1988 | Kosaka et al. | 369/2 |
| 4,792,974 | 12/1988 | Chace | 358/341 |
| 4,839,733 | 6/1989 | Karamon et al. | 358/341 |
| 4,956,712 | 9/1990 | Hong | 358/143 |

FOREIGN PATENT DOCUMENTS

| | | |
|---|---|---|
| 0192412 | 8/1986 | European Pat. Off. |
| 0275041 | 7/1988 | European Pat. Off. |

*Primary Examiner*—Donald McElheny, Jr.
*Attorney, Agent, or Firm*—Lewis H. Eslinger; Jay H. Maioli

[57] ABSTRACT

An optical recording disc on which an analog audio signal and a digital audio signal are recorded is tested. The analog audio signal results from FM-modulating 2-channel audio signals, and the digital audio signal results from modulating the same 2-channel audio signals in a digital fashion, in order to perform the test, a signal mixed with 2-channel audio signals resulting demodulating an analog audio signal and a signal mixed with 2-channel audio signals resulting from demodulating a digital audio signal are simultaneously reproduced by an electroacoustic transducer and evaluated.

2 Claims, 3 Drawing Sheets

TEST APPARATUS FOR AN OPTICAL RECORDING DISC

BACKGROUND OF THE INVENTION

1. Field of the Invention

The present invention relates generally to test apparatus and, more particularly, is directed to a test apparatus for testing a metal disc (i.e., stamper) used to manufacture an optical video disc or for testing tone quality of a molded optical video disc.

2. Description of the Prior Art

In an optical video disc, an analog audio signal is of course recorded together with a video signal. Recently, in order to improve tone quality, there is such an optical video disc in which a digital audio signal according to the same format as that of a so-called compact disc is recorded together with a video signal and an analog audio signal.

In a prior-art optical video disc, a video signal and an audio signal are recorded with a frequency allocation shown in FIG. 1.

More specifically, as shown in FIG. 1, a video signal and two-channel stereo audio signals are FM-converted to FM signals by an FM modulator. That is, the video signal is converted to a video FM carrier signal 30 having a center frequency of 8.5 MHz (frequency deviation is 1.7 MHz) and the stereo two-channel audio signals are converted to an audio FM carrier signal 31 (hereinafter, simply referred to as an analog audio signal) comprising one channel having a center frequency of 2.3 MHz and two channel having a center frequency of 2.8 MHz (frequency deviation is ±100 kHz). Further, as earlier noted, the two channel audio signal is pulse code modulated (PCM) by 16 bits and then converted to a digital audio signal 33 in a so-called eight- to-fourteen modulation (EFM) manner. This digital audio signal 33 has the same format as that of the compact disc and has the same content as the analog audio signal and is inserted into the band lower than 2 MHz as shown in the frequency allocation of FIG. 1.

The above-mentioned video FM carrier signal 30 is pulse width modulated (PWM) by the analog signal as a square wave signal. When the recording laser light source is turned ON and OFF in response to the signal waveform to which the digital audio signal is added, a recording laser beam is irradiated on a photoresist coated on the glass master disc so that the photoresist is exposed. Thereafter, when the photoresist is developed, concave and convex patterns corresponding to the signal waveform are formed on the glass master disc by the photoresist, thus the master disc being constructed as the recording master disc. This master disc is nickel-plated by an electroforming-process or electroless plating-process and then the nickel-plated portion is removed from the master disc, thereby forming a stamper. Then, on the basis of the stamper, a disc substrate for a video disc formed of a synthetic resin is copied by a predetermined method such as an injection molding process or the like. A metal thin film is formed on this disc substrate by depositing or sputtering a metal such as aluminum (Al) or the like and then a protecting layer is formed on the metal thin film, thus an optical video disc being formed.

FIG. 2 shows a block diagram of a test apparatus for testing a video signal and an audio signal reproduced from a master disc, a stamper or duplicated disc substrate and optical video disc. In the following description, the master disc, the stamper, the disc substrate and the optical video disc will hereinafter be referred to as a disc for simplicity. FIG. 2 shows an example of the test apparatus which tests tone quality of a stamper 2 provided as the aforenoted disc.

The two-channel analog audio signal 31 and the two-channel digital audio signal 33 recorded on the stamper 2 may be supplied from the same source or different sources. In most cases, the same source is employed to record the same content on the stamper 2 and the video signal is of course recorded on the stamper 2.

The stamper 2 is held on a turntable 1 and, the turntable 1 is rotated by a motor 3. An optical pickup 4 comprises a reproducing laser light source, an objective lens for converging a laser beam emitted from the laser light source on the disc, a detecting device for receiving a reflected-back light from the optical disc through the objective lens and the like, though not shown. The optical pickup 4 is moved along the radial direction of the stamper 2 under the control of a feed control circuit 5. The motor 3 and the feed control circuit 5 are controlled by a playback control circuit 6.

When the disc, inter alia, the stamper 2 is reproduced and tested by this test apparatus, the turntable 1 is rotated in the direction opposite to the normal rotational direction. When the master disc, the duplicated video disc and the like are reproduced and tested, the turntable 1 is rotated in the clockwise direction similarly when the standard optical video disc is reproduced.

The detecting device (not shown) of the optical pickup 4 detects the laser beam irradiated on and reflected back from the stamper 2 to provide an RF signal. The RF signal is supplied to and amplified by a first stage amplifier 7. Then, the video signal thereof is supplied to a bandpass filter (BPF) 8, in which it is filtered out to provide the FM video carrier signal 30. The video signal is demodulated by a video demodulator 9, and the demodulated output is supplied to a 1H delay circuit 10 (H represents one horizontal period). The 1H-delayed video signal and the video signal which is not delayed are switched by a switch device 14 and supplied through a video amplifier 15 to a monitor cathode ray tube (CRT) 16, thereby being displayed. The switch device 14 is changed in position in response to a detected output from a dropout detecting circuit 17 which is supplied with the RF signal from the first stage amplifier 7. If the RF signal contains a dropout component, it is compensated for by the previous value. The video demodulated output is decoded by a 24/40-bit code decoder 11 and then displayed on a display device 12. The 24/40-bit code is a time code.

The analog audio signal 31 and the digital audio signal 33 involved in the RF signal are separated by bandpass filters (BPFs) 19 and 24. More precisely, the band of 2 to 3 MHz of the analog audio signal 31 is filtered-out and the band of lower than 2 MHz of the digital audio signal 33 is filtered-out. The outputs of the bandpass filters 19 and 24 are supplied to an FM demodulator 20 and to an EFM decoder 25, in which they are FM-demodulated and decoded, respectively. The outputs from the FM-demodulator 20 and the EFM decoder 25 are supplied to first and second fixed contacts a and b of a switch device 21. An audio amplifier 22 is connected to a movable contact c of the switch device 21 and, an output of the audio amplifier 22 is supplied to a sound emanating device 23 such as a headphone, speaker and the like. A sub-code decoder 26 is supplied with the sub-code from the EFM decoder 25 and a display device 27 displays the thus decoded sub-code.

In the above-mentioned circuit arrangement of the prior art, in order to test the tone quality of the analog audio signal recorded in the stamper 2, the switch device 21 connects its movable contact c to the first fixed contact a to test the analog audio signal in a real time fashion. In the next step, the switch device 21 connects its movable contact c to the second fixed contact b to test the digital audio signal in a real time fashion. This is because the analog audio signal and the digital audio signal are recorded using different recording principles so that failure occurs in different ways, which requires testing the tone qualities thereof independently. Further, since the disc such as the stamper 2 and the like is tested in a real time fashion, a very long period of time, for example, twice the recording time, is needed in order to test the tone quality.

OBJECTS AND SUMMARY OF THE INVENTION

Accordingly, it is an object of the present invention to provide an improved test apparatus for testing an optical recording disc in which the aforenoted shortcomings and disadvantages of the prior art can be avoided.

More specifically, it is an object of the present invention to provide a test apparatus for testing an optical recording disc in which an analog audio signal and a digital audio signal are tested simultanously so that the time necessary for testing can be reduced considerably.

It is another object of the present invention to provide a test apparatus for testing an optical recording disc in which an optical recording disc can be tested more efficiently.

According to a first aspect of the present invention, an optical recording disc test apparatus for testing an optical recording disc on which analog audio signals, which result from frequency-modulating 2-channel audio signal, and a digital audio signal, which results from pulse-code-modulating the 2-channel audio signals, are both recorded comprises a first mixing circuit for mixing 2-channel audio signals which result from demodulating the analog audio signals, a second mixing circuit for mixing the 2-channel audio signals which result from demodulating the digital audio signals, and an electroacoustic transducing device supplied at its left channel and right channel input terminals with outputs from the first and second mixing circuits and for testing the analog and digital audio signals recorded on the optical recording disc simultaneously.

According to a second aspect of the present invention, an optical recording disc test method is provided to test a tone quality of an optical recording disc on which an analog audio signal, which results from frequency-modulating 2-channel audio signals, and a digital audio signal, which results from modulating the 2-channel audio signals in a digital fashion, are recorded. This optical recording disc test method is characterized in that 2-channel audio signals, which result from demodulating the analog audio signal, and 2-channel audio signals, which result from demodulating the digital audio signal, are simultaneously reproduced thereby to test the optical recording disc.

The above, and other objects, features and advantages of the present invention, will be apparent in the following detailed description of a preferred embodiment when read in conjunction with the accompanying drawings, in which like reference numerals are used to identify the same or similar parts in the several views.

DETAILED DESCRIPTION OF A PREFERRED EMBODIMENT

An embodiment of the test apparatus for testing an optical recording disc according to the present invention will be described with reference to FIG. 3.

Figure 1:
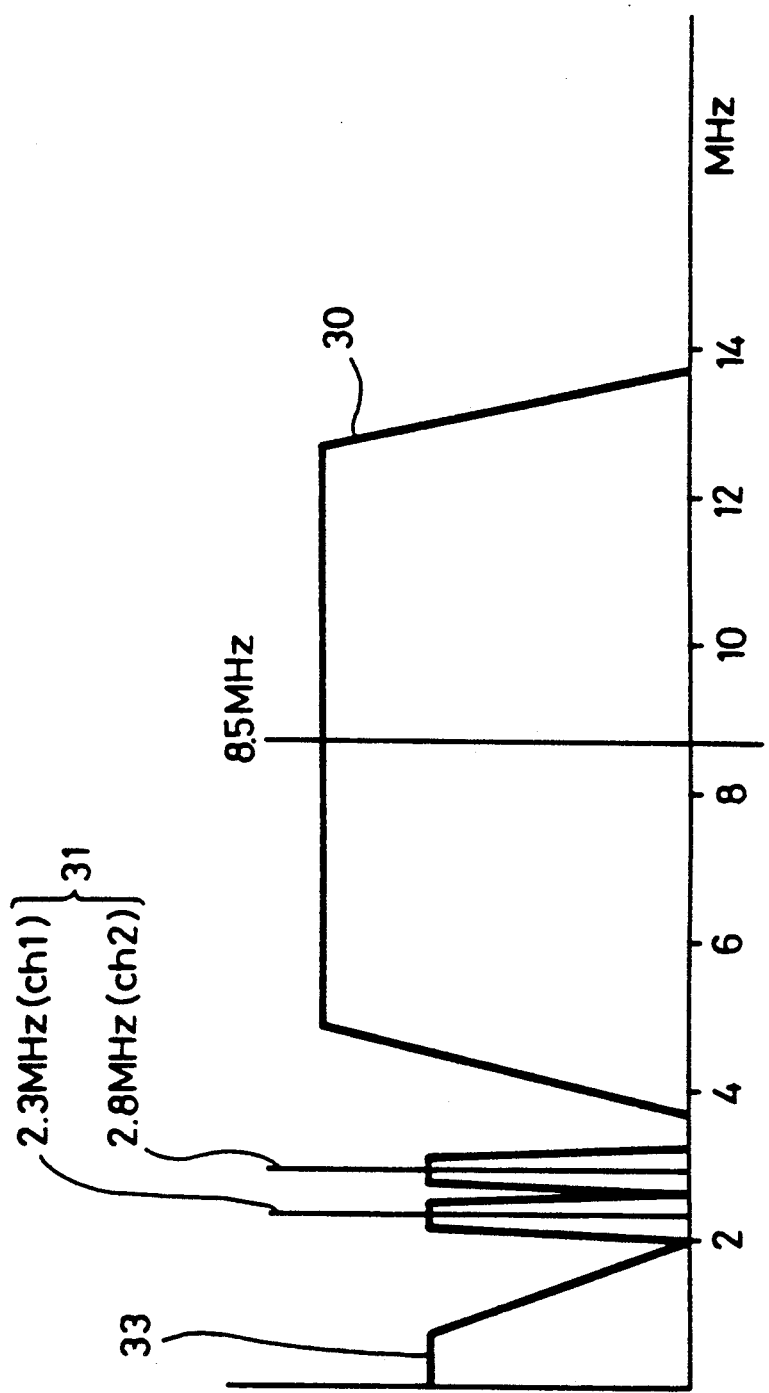
FIG. 1 is a schematic diagram showing a frequency allocation of a video disc that is used to explain the present invention.
Figure 2:
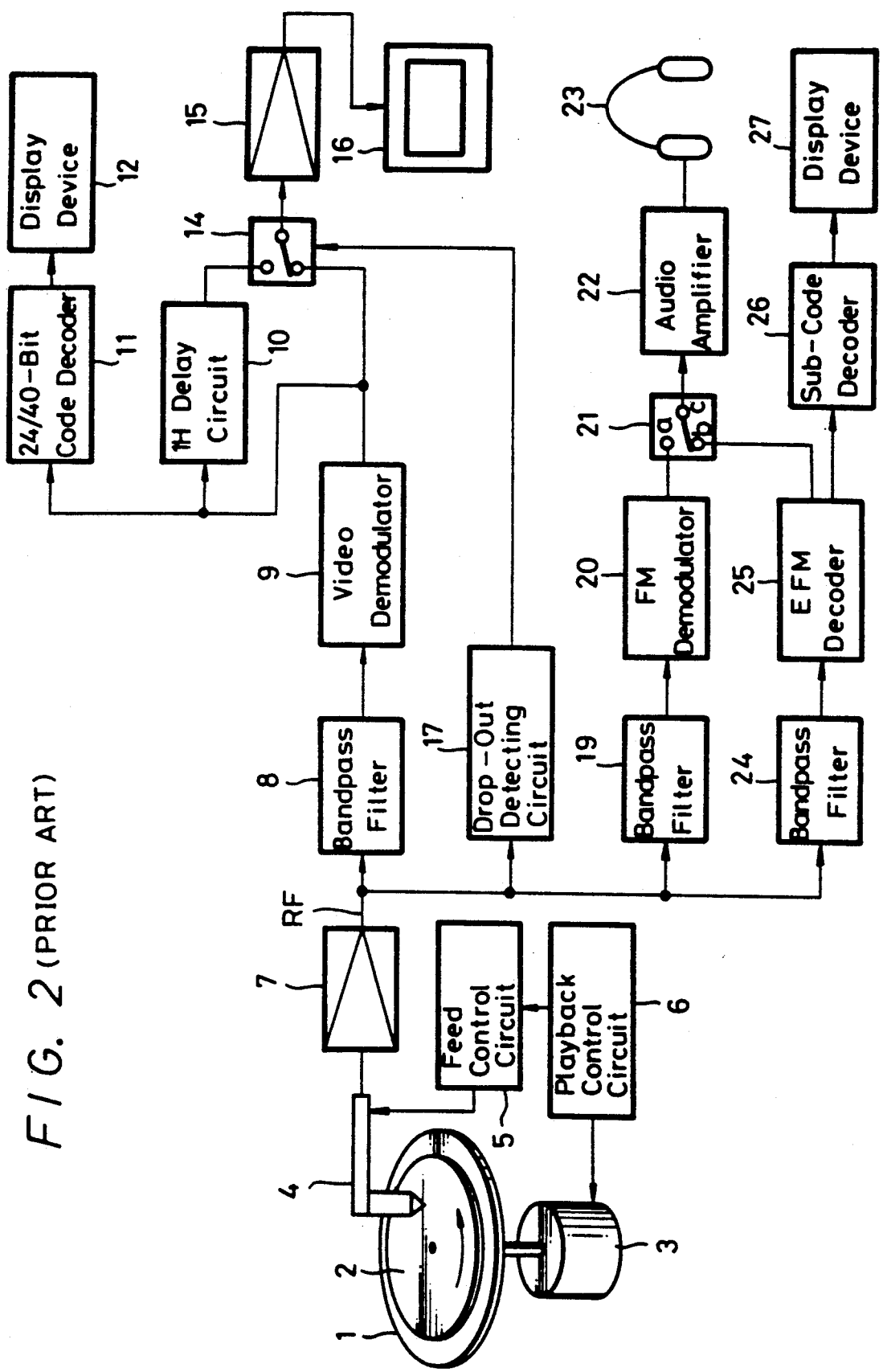
FIG. 2 is a block diagram showing a test apparatus for testing an optical recording disc according to the prior art.
Figure 3:
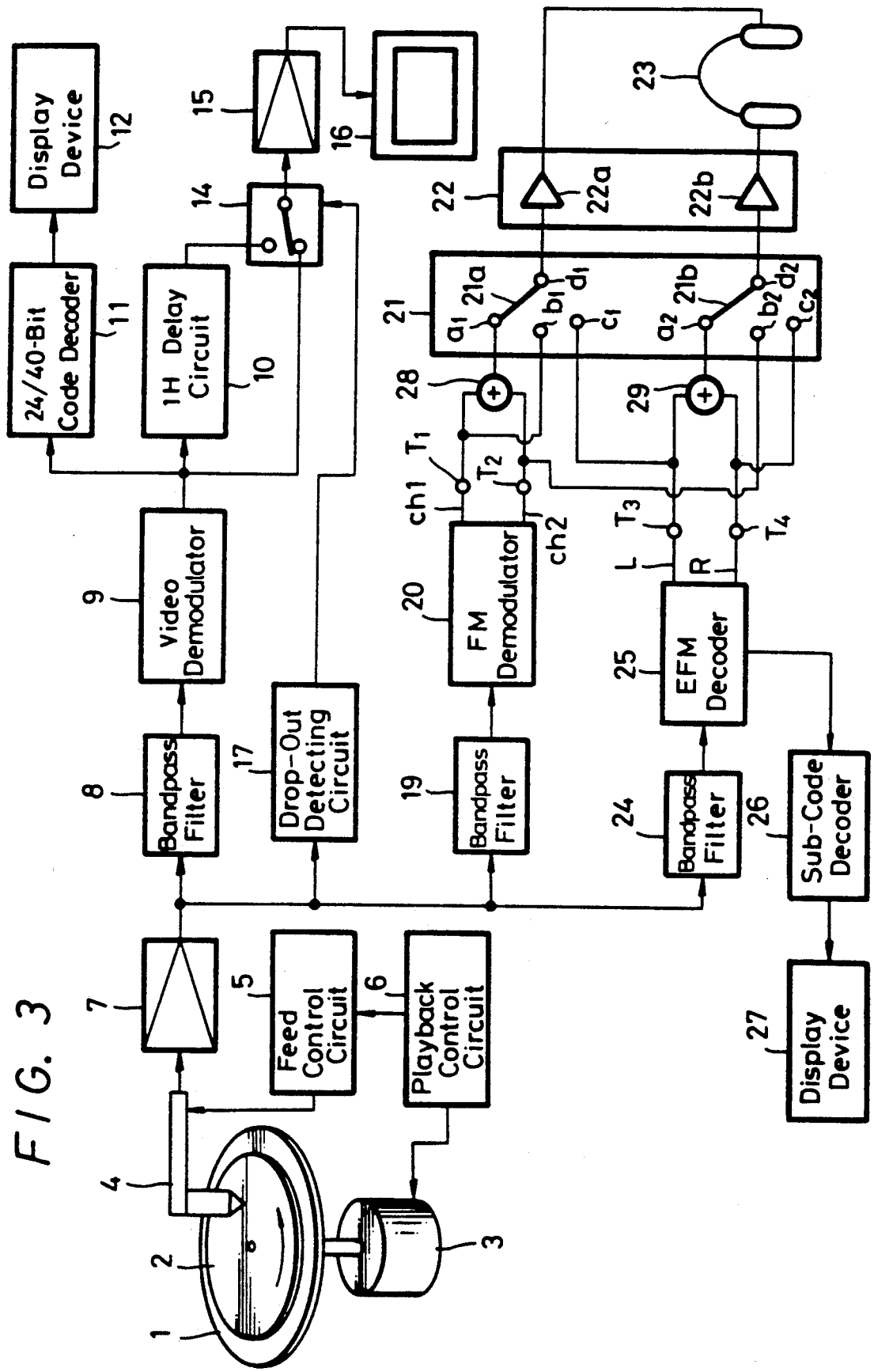
FIG. 3 is a block diagram showing an embodiment of a test apparatus for testing an optical recording disc according to the present invention.

In FIG. 3, like parts corresponding to those of FIG. 2 are marked with the same references and therefore need not be described in detail.

In FIG. 3, the drive system for driving the stamper 2, the reproducing optical system for reproducing the optical disc 2 and the video signal reproducing system are arranged in the same fashion as that of FIG. 2.

In this embodiment shown in FIG. 3, a first channel output ch1 and a second channel output ch2 of the analog audio signal from the FM demodulator 20 and stereo left and right audio signals L and R of, for example, the digital audio signal from the EFM decoder 25 are supplied to output terminals $T_1$, $T_2$, and $T_3$, $T_4$, respectively. The output terminals $T_1$ and $T_2$ are connected to a first mixing circuit 28 and the output terminals $T_3$ and $T_4$ are connected to a second mixing circuit 29. Output terminals of the first and second mixing circuits 28 and 29 are connected to first fixed contacts $a_1$ and $a_2$ of first and second switches 21a and 21b of, for example, a triple-pole double throw type switch 21, and the output terminals $T_1$ and $T_3$ are connected to second and third fixed contacts $b_1$ and $c_1$ of the first switch 21a, respectively. The output terminals $T_2$ and $T_4$ are connected to second and third fixed contacts $b_2$ and $c_2$ of the second switch 21b, respectively. Movable contacts $d_1$ and $d_2$ of the first and second switches 21a and 21b are connected to left and right input terminals of the sound emanating device 23 such as a headphone or the like through a stereo amplifier 22 formed of audio amplifiers 22a and 22b.

An operation of the thus constructed disc test apparatus will be described hereinbelow.

The stamper 2 is held on the turntable 1 as a test disc. When the drive motor 3 is rotated, then the optical pickup 4 is moved along the radial direction of the stamper 2, whereby 2-channel analog/digital audio signals are extracted through the bandpass filters 19, 24, the FM demodulator 20 and the EFM decoder 25 and are mixed together by the first and second mixing circuits 28 and 29 to provide monaural signals, respectively. Accordingly, the movable contacts $d_1$ and $d_2$ of triple pole double throw type switches 21a and 21b are connected to their fixed contacts $a_1$ and $a_2$, whereby the mixed signals, i.e., the analog and digital audio signals are simultaneously monitored by left and right headphones of the sound emanating device 23.

If the movable contacts $d_1$ and $d_2$ are connected to the fixed contacts $b_1$ and $b_2$, only the analog audio signal can be monitored by the left and right headphones. In the same fashion, if the movable contact $d_1$ and $d_2$ are connected to the fixed contacts $c_1$ and $c_2$, then only the digital audio signal can be reproduced and monitored by the left and right headphones.

According to this embodiment, when the user tests the optical recording disc such as the stamper 2 or the like, the user listens to the reproduced sounds of the two analog and digital audio signals of the same content by the left and right headphones to check whether or not the test optical recording disc has failures such as noise, drop-out, a mute portion and the like. If the user hears an abnormal sound, the user can readily determine which of the analog or digital audio signal source has a failure. Therefore, the user can specify the cause of such failure and a time for removing such failure can be reduced. While it takes 120 minutes for the user of the apparatus of FIG. 2 to test a software program in which a music program of, for example, 60 minutes is recorded, according to this invention, it takes 60 minutes to test such software program.

While the test apparatus for the stamper is described in this embodiment, it is needless to say that the copied disc substrate, the optical video disc, the master disc or the like can be similarly tested.

According to the test apparatus for an optical recording disc of the present invention, a time for testing an audio signal can be reduced to half of that of the prior art which is twice of the recording time, and the time, necessary for testing can be reduced considerably.

Further, since it is readily determined which of the analog or digital audio signal has an audio failure portion, an analyzing process for analyzing a failure of analog and digital signals can be readily performed, thus making it possible to minimize the number of failures.

In a like manner, since information concerning an audio failure cause of an optical recording disc is readily fed back to the production line, the problems can be solved in a short period of time.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. Apparatus for evaluating the quality of audio signals simultaneously reproduced from an optical recording disc on which analog audio signals which result from frequency-modulating 2-channel audio signals, and digital audio signals which result from pulse-code-modulating said 2-channel audio signals, are both recorded, said apparatus comprising:

first demodulator means for demodulating said analog audio signals to produce a first pair of 2-channel audio signals;

second demodulator means for demodulating said digital audio signals to produce a second pair of 2-channel audio signals:

first mixing means for mixing said first pair of 2-channel audio signals which result from demodulating said analog audio signals to produce a mixed analog audio signal;

second mixing means for mixing said second pair of 2-channel audio signals which result from demodulating said digital audio signals to produce a mixed digital audio signal;

electroacoustic transducing means having left channel and right channel input terminals both selectively supplied with outputs from said first and second mixing means; and switching means for selectively bypassing said first and second mixing means and selectively supplying directly to said left channel and right channel input terminals of said electroacoustic transducing means said first pair of 2-channel audio signals or said second pair of 2-channel audio signals, whereby said electroacoustic transducing means provides selected audio signals to a listener for evaluating said analog and digital audio signals recorded on said optical recording disc.

2. A method using left and right channels of an electroacoustic transducer for evaluation a tone quality of an optical recording disc on which an analog audio signal, which results from frequency-modulating 2-channel audio signals, and a digital audio signal, which results from modulating said 2-channel audio signals in a digital fashion, are recorded, the method comprising the steps of:

reproducing and demodulating said analog audio signal to form a first pair of 2-channel audio signals;

reproducing and demodulating said digital audio signal to form a second pair of 2-channel audio signals;

mixing said first pair of 2-channel audio signals to produce a mixed analog audio signal;

mixing said second pair of 2-channel audio signals to produce a mixed digital audio signal;

selectively connecting the mixed analog audio signal to the left channel of the electroacoustic transducer and the mixed digital audio signal to the right channel of the electroacoustic transducer; of selectively connecting the first pair of 2-channel audio signals to the respective left and right channels of the electroacoustic transducer; or selectively connecting the second pair of 2-channel audio signals to the respective left and right channels of the electroacoustic transducer; and reproducing the selected signals through the electroacoustic transducer for evaluating the analog and digital audio signals recorded on the optical recording disc.

* * * * *

UNITED STATES PATENT AND TRADEMARK OFFICE
CERTIFICATE OF CORRECTION

PATENT NO. : 5,274,618
DATED : December 28, 1993
INVENTOR(S) : Fumiaki Henmi, Tomio Ohashi and Kunio Nakayama It is certified that error appears in the above-indentified patent and that said Letters Patent is hereby corrected as shown below:

```
In the Abstract, line 7, change ", in" to --.  In--
         line 8, after "resulting" insert --from--
Col. 1, line 34, change "two channel" to --two-channel--
Col. 2, line 12, change "and," to --, and--
Col. 3, line 49, delete "and" second occurrence
Col. 5, line 28, after "art" insert --,--
         same line, after "time" second occurrence,
         delete ","
```

In the Claims:

```
Col. 6, line 27, change "evaluation" to --evaluating--
         line 46, change "of" second occurrence, to --or--
```

Signed and Sealed this

Sixth Day of June, 1995

*Attest:*

BRUCE LEHMAN

*Attesting Officer*  Commissioner of Patents and Trademarks